(No Model.)
E. R. YOUNG.
PEA AND BEAN SHELLER.
No. 308,589. Patented Nov. 25, 1884.
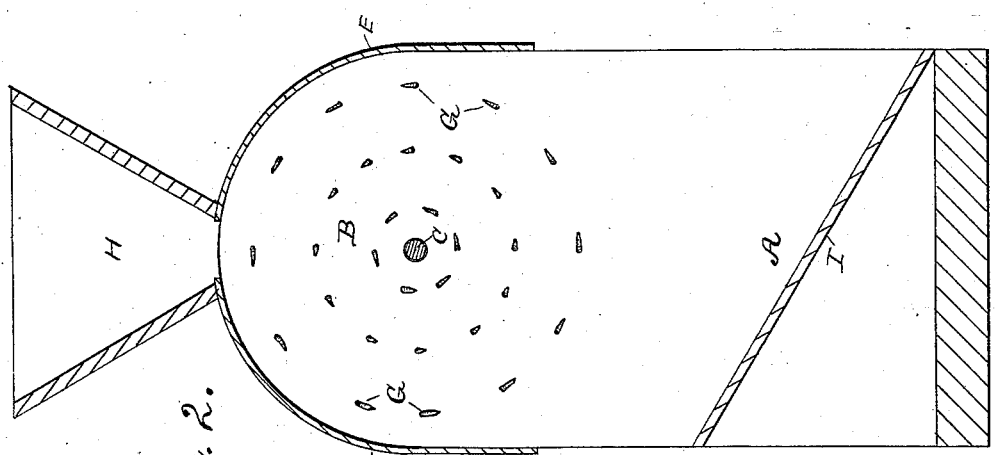
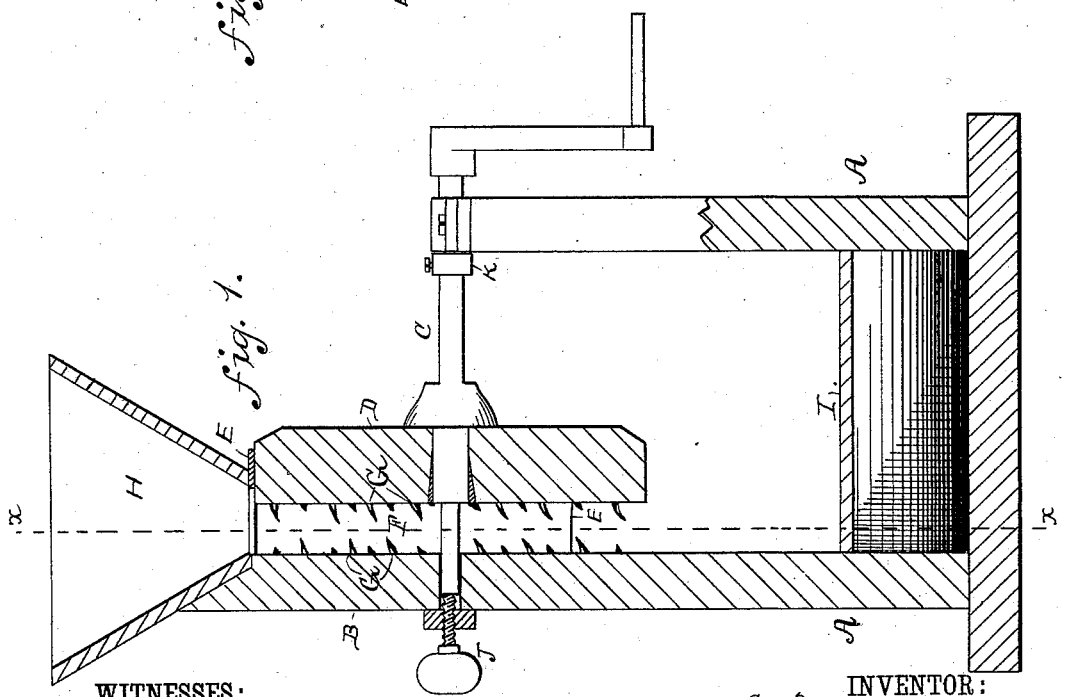
WITNESSES:
INVENTOR:
E. R. Young
BY Munn & Co
ATTORNEYS.

United States Patent Office.

ELLIS R. YOUNG, OF THOMASVILLE, GEORGIA.

PEA AND BEAN SHELLER.

SPECIFICATION forming part of Letters Patent No. 308,589, dated November 25, 1884.

Application filed July 8, 1884. (No model.)

*To all whom it may concern:*

Be it known that I, ELLIS ROBINSON YOUNG, of Thomasville, in the county of Thomas and State of Georgia, have invented a new and useful Improvement in Pea and Bean Shellers, of which the following is a full, clear, and exact description, reference being had to the annexed drawings, forming part thereof.

The invention relates to rotary mills for shelling peas and beans; and the novel features of the same will be pointed out in the claim.

In the drawings, in which Figure 1 is a vertical cross-section of the sheller, and Fig. 2 a longitudinal section on the line $xx$, Fig. 1, A indicates the supporting-frame, forming a wall, B, at one end thereof, and C is a shaft journaled in said frame and carrying a disk, D, which is arranged parallel with the wall B. To the edges of the wall B is secured sheet-metal or other casing, E, which fits close about the periphery of the disk D to form a close chamber, F, for holding the peas or beans while they are being shelled. The inner surfaces of the wall B and disk D are provided with pointed and oppositely-inclined teeth G, which are arranged in circles, the circles of the disk being directly opposite to those of the wall. The circles of the disk, as well as those of the wall, are preferably one-half inch apart, and the teeth of each circle one inch apart. The teeth are of two different lengths, a circle of short teeth being made to alternate with a circle of longer teeth in both the disk and the wall, and the circle or circles of short teeth in the disk are placed opposite to the circles of longer teeth in the wall, and vice versa. The peas or beans are fed in at the top of the disk through the hopper H, and are discharged on the inclined apron I, leading down to one side of the sheller. The disk is to be adjusted nearer to or farther from the wall by means of a set-screw, J, bearing against one end of the shaft, and a collar, K, which is adapted to be set to hold the shaft against the screw in a well-known manner. Circles of long teeth on one plane of the mill opposed by circles of short teeth on the other plane, and the circles of long and short teeth alternating with each other on each plane, tend to catch hold of the shells with more certainty than if the points of the teeth were in each instance in a single plane, and at the same time opposing teeth are in no place near enough together to damage the fruit.

What I claim is—

The combination, in a pea and bean sheller, with a stationary plane wall provided with alternating circles of long and short teeth, and a casing supported on said wall, of a disk journaled in said wall parallel thereto and concentric with the said circles of teeth, the disk being provided with alternating circles of short and long teeth, its circles of short teeth being opposite to circles of long teeth on the wall, and its circles of long teeth being opposite to circles of short teeth on the wall, substantially as shown and described.

ELLIS R. YOUNG.

Witnesses:
S. A. McDERMOTT,
W. H. BRANDON.